United States Patent [19]

Ugo

[11] Patent Number: 5,393,322

[45] Date of Patent: Feb. 28, 1995

[54] PROCESS FOR RECOVERING NOBLE METALS FROM SOLUTIONS DERIVING FROM THE TREATMENT OF NUCLEAR FUELS

[75] Inventor: Renato Ugo, Milan, Italy

[73] Assignee: C.E.S.E.C. Centro Europeo Studi Economici e Chimici Srl, Milan, Italy

[21] Appl. No.: 940,917

[22] Filed: Sep. 4, 1992

[51] Int. Cl.$^6$ .............................................. C22B 11/00
[52] U.S. Cl. .................................... 75/344; 75/371; 75/393; 75/720; 423/2
[58] Field of Search ............... 423/2; 75/344, 393, 75/371, 720

[56] References Cited

U.S. PATENT DOCUMENTS

| | | | |
|---|---|---|---|
| 3,672,875 | 6/1972 | MacCragh | 75/393 |
| 3,890,244 | 6/1975 | Carlin | 423/2 |
| 3,922,231 | 11/1975 | Carlin et al. | 423/2 |
| 4,081,271 | 3/1978 | Ugo | 75/108 |
| 4,162,231 | 7/1979 | Horwitz | 423/2 |
| 4,163,664 | 8/1979 | Ugo | 75/108 |
| 4,526,658 | 7/1985 | Kubota et al. | 423/2 |
| 5,082,603 | 1/1992 | Horie et al. | 423/2 |
| 5,185,104 | 2/1993 | Horie | 423/2 |

FOREIGN PATENT DOCUMENTS 941985  11/1963  United Kingdom .

*Primary Examiner*—Edward A. Miller
*Attorney, Agent, or Firm*—Hedman, Gibson & Costigan

[57] ABSTRACT

A process for recovering palladium, rhodium and ruthenium from aqueous solutions deriving from the treatment of nuclear fuels and containing also iron and nickel, by reducing carbonylation with carbon monoxide at a pressure up to 1 atmosphere in a nitric acid solution at a pH of between 2 and 4 and at a temperature of between room and 100° C. and reaction times of from 6 to 100 hours.

9 Claims, No Drawings

PROCESS FOR RECOVERING NOBLE METALS FROM SOLUTIONS DERIVING FROM THE TREATMENT OF NUCLEAR FUELS

INVENTION FIELD

The present invention relates to a process for recovering noble metals, from aqueous solutions deriving from the treatment of nuclear fuels, by reducing carbonylation.

STATE OF THE ART

In nuclear power plants, during nuclear fission of uranium, and particularly of plutonium, considerable amounts of noble metals are produced, among which in higher yields palladium, rhodium and ruthenium, which are contained in waste nuclear fuels after nuclear fission.

The exhausted fuels generally undergo the following chemical treatment: dissolution with nitric acid, to allow the successive extraction of uranium and plutonium, addition of formaldehyde to eliminate the excess of nitric acid, concentration and vitrification of the ensuing solution.

The fuel employed in a nuclear reactor at low thermal enrichment, undergoing nuclear fission produces, per ton, the following amounts of noble metals: rhodium, between 335 and 480 g; palladium, between 880 and 1660 g; ruthenium in amounts comprised between 50 and 75% in excess with respect to the amount of palladium.

Higher amounts of noble metals may be obtained from faster nuclear reactors of more recent vintage.

At any rate, as nuclear power plants will substitute conventional power plants, wastes deriving from recycle chemical treatments and from inactivation of exhausted fuels will constitute alternative sources of rhodium able to provide rhodium in higher amounts than those presently provided to the western world coming from mines (South Africa, Canada).

A similar situation will apply for palladium and ruthenium if and when nuclear power will become the most important source of electric power at the end of this century or at the beginning of the next.

Moreover, the ratios between the various metals obtained from exhausted nuclear fuels will be different from the ones resulting from mineral ores. Thus, their recovery could remove some limitations.

It should be observed, however that, of the three mentioned metals, only rhodium and palladium are strategically important. As to ruthenium, it is recovered in part as Ru106, which is radioactive and cannot be employed for at least 45 years, and in part as Ru103 which requires only 5 years before being usable. Palladium and ruthenium, on the other hand, are practically stable as obtained. In fact, although the palladium fission product may contain 18 to 20% of the 107 isotope, its beta energy is so low that it is retained in the self shield. As to rhodium, one of its fission products, Rh103, is stable, while several other isotopes have very short half lives, from a minimum of a few seconds to a maximum of 36 hours. However, if the Rh103 isotope is obtained admixed with Ru106, it also requires a range of from 4 to 5 years control before use.

At any rate, the recovery on a large scale of rhodium and palladium from this source would be very attractive and may have a strong impact on the world economy; in fact, the requirements of rhodium and palladium have increased considerably in the last few years, in the U.S., Japan and in Europe.

However, a serious problem exists in the recovery of said metals from nuclear fission wastes, namely the fact that these wastes contain many different metals, such as iron and nickel, in considerable concentrations.

The methods known up to now for the separation and recovery of noble metals from exhausted nuclear fuels may be classified as follows:
precipitation as salts or as chemical compounds in general
cementation
electrolytic separation
fixation of the metal ions on resins or on solid compounds having chelating or complexing groups.

None of the above methods leads, however, to a complete recovery of the precious metals, and more complex recycling methods are necessary to this end.

The U.S. Pat. No. 4,163,664 describes a process for the total recovery of precious metals, such as silver, gold, iridium, palladium, platinum, osmium, rhodium and ruthenium from any solution containing them without the need of recycling. The treatment consists essentially in treating solutions containing said metals with carbon monoxide. This treatment is carried out at a pH of between 0 and 7, at temperatures of between 20° and 200° C. and CO pressures of between 1 and 100 atmospheres.

The process is applied particularly to waste catalysts from oil refineries or to the recovery of catalysts from catalytic exhaust muffler.

The U.S. Pat. No. 4,081,271 describes a process for the practically total separation of rhodium and iridium from one or more metals, such as silver, gold, osmium, platinum, palladium, ruthenium, from solutions containing them.

As known, noble metals obtained by the methods described in said patents may always contain other metals as impurities, and if these have a protracted radioactivity, their co-precipitation prevents the use of the recovered precious metals.

THE PRESENT INVENTION

The applicant has now unexpectedly found that it is possible to recover palladium, rhodium and ruthenium from water solutions deriving from the treatment of nuclear fuels, and containing also iron and nickel in high concentrations, by reducing carbonylation at a pressure of carbon monoxide of up to 1 atmosphere in a nitric acid solution, at a pH of between 2 and 4 and at a temperature of between room and 100° C., with reaction times comprised between 6 and 100 hours.

DETAILED DESCRIPTION OF THE INVENTION

The applicant has unexpectedly found that it is possible to recover, from aqueous nitric acid solutions deriving from the treatment of exhausted nuclear fuels, and containing also iron and nickel in high concentrations, first palladium and then rhodium together with ruthenium by reducing carbonylation as follows:

a) The diluted nitric acid solution deriving from the treatment of exhausted fuel is brought to pH comprised between 2 and 3, preferably comprised between 2.8 and 2.9, and is then treated with carbon monoxide at room temperature for 6 to 10 hours, preferably 7 hours, and the precipitated palladium is filtered off.

b) The ph of the filtered solution obtained in step (a) is brought to 4 and the solution is further treated with carbon monoxide at a temperature ranging from 45° to 100° C., preferably at a temperature comprised between 50° and 80° C., for a time ranging from 10 to 60 hours, preferably 40 hours, and the obtained precipitate consisting of rhodium and ruthenium is centrifuged or decanted and then filtered off.

The small amounts of iron which may be contained in both the above precipitates may be largely eliminated by washing with 1 to 3% nitric acid solution or by formation of complexes with selective reagents such as ethylenediaminetetraacetic acid.

Ruthenium can easily be separated from rhodium by oxidation to $RuO_4$ which is volatile and can be collected by reducing condensation as $RuO_2$, or can be removed by re-dissolving the precipitate in $HCl/H_2SO_4$ and separately precipitating Rh and Ru according to the U.S. Pat. No. 4,081,271 or through a further reducing carbonylation.

The process according to the invention is preferably applied to the nitric acid solutions of nuclear fuels after extraction of uranium and plutonium and subsequent reduction of nitric acid with formaldehyde.

The following examples are reported for purely illustrative purposes of the invention.

EXAMPLES A-B-C-A*-B*

500 ml of a nitric acid solution are employed deriving from the treatment of exhausted nuclear fuel, after separation of uranium and plutonium and formaldehyde treatment to eliminate the excess of acid.

The solution, having pH between 0.9 and 1 is analyzed by atomic absorption and found to contain:

| | |
|---|---|
| Pd | 264 ppm |
| Rh | ≈40 ppm |
| Ru | ≈1500–2000 ppm |
| Fe | 60–70 ppm |
| Ni | 9–10 ppm |

Three samples of 50 ml each of the solution are placed in shakers connected to a buret under constant pressure. The pH is brought to 2. The three sample are treated with carbon monoxide at room temperature for respectively 6 hrs (A), 14 hrs (B) and 48 hrs (C). A precipitate is formed, which is filtered off and proves to be soluble in both fuming (90%) and diluted (60%) nitric acid. The solutions of the three samples, after filtration of the precipitates are analyzed by atomic absorption, obtaining the results shown in Table 1.

TABLE 1

| | Solution A ppm | Solution B ppm | Solution C ppm |
|---|---|---|---|
| Pd | 50 | 6.4 | 5 |
| Rh | 37 | 38.6 | 40 |
| Ru | ≈1500–2000 | ≈1500–2000 | ≈1500–2000 |
| Fe | ≈60 | ≈60 | 65 |
| Ni | ≈8–9 | 9 | 9 |

The three solution A, B, C are then brought to pH 3–4 and treated further with carbon monoxide at room temperature for times longer than 48 hours.

No precipitate is evidenced. Further treatment with carbon monoxide (1 atm) at 50° C. of solutions A* and B* is carried out. Solutions A* and B* correspond to solutions A and B of Table 1 brought to pH 4 with sodium carbonate and treated with CO at 1 atmosphere pressure and at 50° C., for, respectively, 24 and 56 hours.

The treatment was made in thermostated reaction vessels with a constant CO flux. In both solutions a orange-brown precipitate was formed, which was filtered off.

Analysis of the filtrates gave the following results:

| | Solution A* ppm | Solution B* ppm |
|---|---|---|
| Pd | — | — |
| Rh | 11.8 | 2.6 |
| Ru | 1500–2000 | 800–900 |
| Fe | 65 | 10 |
| Ni | 9 | 2 |

The precipitates from the two runs are soluble in both fuming (90%) nitric acid and diluted (60%) nitric acid.

EXAMPLE D 200 ml of the same initial solution employed in the preceding examples were treated at pH 2 with carbon monoxide at 1 atm pressure and at 25° C. for 10 hours.

A precipitate is formed which is filtered off, washed accurately with demineralized water and analyzed with the method indicated previously; it consists essentially of palladium (98–99% pure). The filtrate was also analyzed and the results are reported below in comparison with the results of the analysis of the initial solution.

| | Initial solution ppm | Final solution I ppm |
|---|---|---|
| Pd | 264 | 3.2 |
| Rh | 40 | ≈40 |
| Ru | 1500–2000 | 1500–2000 |
| Fe | 60–70 | ≈65 |
| Ni | 9–10 | ≈9 |

The final solution I is brought to pH 4 by addition of sodium carbonate and treated with carbon monoxide under 1 atm, at 50° C. for 56 hours.

A dark precipitate is obtained which is filtered off, washed with distilled water and analyzed by the previously mentioned methods. It is found to consist of 5–7% rhodium and approximately 90% ruthenium, while iron and nickel are only present in traces.

The filtered solution (final solution II) was also anlayzed and the results a reported below in comparison with the initial solution (final solution I).

| | Final solution I ppm | Final solution II ppm |
|---|---|---|
| Pd | 3.2 | — |
| Rh | ≈40 | ≈2 |
| Ru | 1500–2000 | ≈700 |
| Fe | 60 70 | -50 |
| Ni | 9–10 | ≈4 |

EXAMPLE E 200 ml of the same initial solution as employed in the preceding examples and containing palladium, rhodium, ruthenium, iron and nickel in the following concentrations:

| | Solution 1 ppm |
|---|---|
| Pd | 264 |
| Rh | 40 |
| Ru | 1500–2000 |
| Fe | 60–70 |
| Ni | 9–10 | was brought to a pH value of 2.8–3 and treated with carbon monoxide at 1 atm, at room temperature for 7 hours in a sealed system under constant CO atmosphere.

At the end a precipitate is recovered which is washed with 100 ml 1–2% nitric acid and analyzed as previously indicated. The table reports the analysis results:

| | Precipitate 2 |
|---|---|
| Pd | 95–97% by weight |
| Rh | absent (below 0.5%) by weight |
| Ru | absent (below 0.5%) by weight |
| Fe | 3–5% by weight |
| Ni | absent (below 0.5%) by weight |

The solution remaining after filtering the precipitate is also analyzed. The results are reported below:

| | Solution 2 ppm |
|---|---|
| Pd | 3–2 |
| Rh | ≈40 |
| Ru | ≈1500–2000 |
| Fe | ≈50 |
| Ni | ≈9–10 |

Solution 2 is brought to pH 4 and treated with 1 atm. carbon monoxide at 80° C. for 40 hours in a vessel with thermostated reflux cooler, followed by a Drechsel bottle containing a NaOH solution and a bubble counter (carbon monoxide thus bubbles through). A precipitate 3 is recovered, which is washed with 2–3% nitric acid.

The analysis by the previously indicated methods gives the following results:

| | Precipitate 3 (% by weight) |
|---|---|
| Pd | — |
| Rh | 1.9 |
| Ru | 94 |
| Fe | 4.1 |
| Ni | absent (below 0.5%) |

The solution obtained by washing the precipitate with diluted nitric acid (solution 4) is anlayzed by the same methods and gives the following results:

| | Solution 4 ppm |
|---|---|
| Pd | — |
| Rh | — |
| Ru | — |
| Fe | double the amount found in precipitate 3 |
| Ni | — |

The reaction solution after filtration of precipitate 3 (solution 3) is also analyzed and gives the following results:

| | Solution 3 (ppm) |
|---|---|
| Pd | — |
| Rh | 2–3 |
| Ru | 5 |
| Fe | 10–15 |
| Ni | 9–10 |

I claim:

1. A process for sequentially recovering palladium, and a mixture of rhodium and ruthenium from an aqueous nitric acid solution derived from the treatment of exhausted nuclear fuels said process consisting essentially of the essentially of the steps of:
   (a) treating said aqueous nitric acid solution at a pH between 2 and 3 with carbon monoxide at a pressure of up to one atmosphere at room temperature, for 6 to 10 hours, and filtering off the precipitated palladium;
   (b) adjusting the pH of the filtrate of step (a) to 4 and treating the thus obtained solution with carbon monoxide at a temperature ranging from 45° to 100° C. for a time ranging from 10 to 60 hours and then centrifuging or decanting and then filtering off the precipitated rhodium and ruthenium.

2. The process as claimed in claim 1 wherein in step (a) the pH is between 2.8 and 2.9 and the reaction time is 7 hours; and in step (b) the temperature is between 50° and 80° C. and the reaction time is 40 hours.

3. The process as claimed in claim 1 wherein the product of step (a) or (b) is treated with nitric acid or with an iron complexing agent to remove any iron.

4. The process as claimed in claim 3 wherein the nitric acid has a concentration of 1 to 3%.

5. The process as claimed in claim 3 wherein the complexing agent is ethylenediaminetetraacetic acid.

6. The process as claimed in claim 1 wherein ruthenium is separated from rhodium by oxidizing the rhodium to volatile $Ru_4O$, which converted by reducing condensation to $RuO_2$.

7. The process as claimed in claim 1 wherein ruthenium is separated from rhodium by redissolving the precipitate in $HCL/H_2SO_4$ and separately precipitating rhodium and ruthenium through a subsequent carbonylation step.

8. The process as claimed in claim 1 wherein the aqueous nitric acid solution is obtained by treating with formaldehyde, the nitric acid residue which is left after uranium and plutonium is extracted from exhausted nuclear fuel.

9. The process of claim 1 wherein the carbon monoxide in step (a) and step (b) is at 1 atmosphere of pressure.

* * * * *